United States Patent

[11] 3,581,310

[72] Inventor Trevor Buckley
 Malvern, England
[21] Appl. No. 814,529
[22] Filed Apr. 9, 1969
[45] Patented May 25, 1971
[73] Assignee Frowds Limited
 Teddington, England
 a part interest
[32] Priority Apr. 24, 1968
[33] Great Britain
[31] 19,399/68

[54] RADAR SYSTEMS
 5 Claims, 3 Drawing Figs.
[52] U.S. Cl. .................................................. 343/7.7,
 343/5, 340/258
[51] Int. Cl. ..................................................... G01s 9/42
[50] Field of Search ....................................... 343/5 (PD),
 7.7; 340/258 (A), 258 (B)

[56] References Cited
UNITED STATES PATENTS
3,471,845 10/1969 Sokoloff ...................... 343/5(PD)X Primary Examiner—Rodney D. Bennett, Jr.
Assistant Examiner—T. H. Tubbesing
Attorney—Holman, Glascock, Downing and Seebold ABSTRACT: A radar system in which a transmitter and a receiver are located at each of two different sites, the transmitters being operated at different frequencies and some of the power of each transmitter serving as a local oscillator for the receiver which is located on the same site and which receives signals from the other transmitter to provide an intermediate frequency output, the two intermediate frequency outputs being mixed to provide a signal dependent only upon the rate of change of the total path length between the two sites via a target.

RADAR SYSTEMS

This invention relates to radar systems and is concerned more particularly with Doppler radar systems in which the change of frequency, due to the Doppler Effect, of a received signal is used to detect relative movement between a target and the system.

Small scale Doppler radar systems have been proposed for use as intruder alarm systems, but they suffer from the disadvantage that relatively very small targets not intended to be detected such as vermin, birds and even small insects can cause false alarms when at short range due to the fact that in a monostatic radar system the power of the echo signal increases very rapidly as the range of the target from the system decreases due to the inverse relationship between the power of the echo signal and $R^4$, R being the range of the target.

In order to overcome this difficulty, it has been proposed to employ a bistatic radar system in which the transmitter and receiver are separated by a distance which is comparable to the range at which it is required to detect a wanted target. With this arrangement, the echo signal still increases as a target approaches either the transmitter or receiver since the power of the echo signal is inversely proportional to $R_t^2 R_r^2$ (where $R_t$ and $R_r$ are the distances from the target to the transmitter and receiver respectively). However, at very short range, i.e. within the selected target area, as $R_t$ or $R_r$ decreases the other will increase so that the power of the echo signal will not increase as rapidly as it does with a monostatic system.

That is to say, a bistatic system has less tendency than a monostatic system to "overdetect" or become exceptionally sensitive at very short ranges.

This advantage can be further enhanced if the areas illuminated by the transmitter and receiver aerials are so arranged that a target close to the receiver aerial receives only a very small proportion of transmitter power, and similarly only a small proportion of the power reflected by a target close to the transmitter aerial is collected by the receiver aerial.

However, a major disadvantage of a bistatic system is the need to transfer a sample of the transmitted signal to the receiver site to serve as a reference for the signal reflected from the target and it is an object of the present invention to overcome or reduce effectively this disadvantage.

The present invention consists of a radar system in which a transmitter and a receiver are located at each of two different sites, the transmitters being operated at different frequencies and some of the power of each transmitter serving as a local oscillator for the receiver which is located on the same site and which receives signals from the other transmitter to provide an intermediate frequency output, the two intermediate frequency outputs being mixed to provide a signal dependent only upon the rate of change of the total path length between the two sites via a target.

Figure 1:
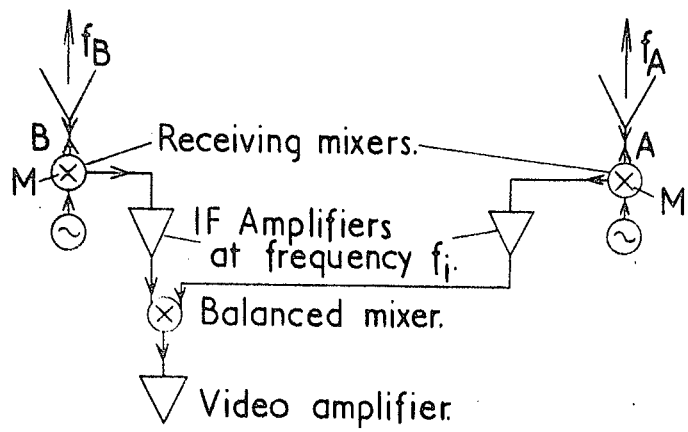
FIG. 1 shows the form of radar system according to the present invention.

In carrying the invention into effect according to one convenient mode by way of example, FIG. 1 shows a radar system which includes a transmitter at site A transmitting a signal at a frequency $f_A$ to a receiver at site B, and likewise a transmitter at site B transmitting a signal at a frequency $f_B$ to a receiver at site A.

At site A some of the transmitter power $f_A$ serves via mixer M as a local oscillator for the receiver of signals $f_B$, and at site B some of the transmitter power $f_B$ serves via mixer M as a local oscillator for the receiver of signals $f_A$.

The two receiver mixers M are connected to narrow band IF amplifiers of identical construction both tuned to a frequency $f_i$ where $f_i \approx f_A - f_B$. In this way low frequency signals, generated by the monostatic action between each transmitter and the receiver on the same site, are rejected.

When a reflecting body enters the region covered by the aerials at both sites A and B, a signal will be received at site A at a frequency of $f_B + f_D$, and at site B at a frequency of $f_A + f_D$, where $f_D$ is the Doppler frequency shift proportional to the rate of change of the path length between the aerials via the moving target.

The signal received at site A, on mixing with the local oscillator frequency $f_A$ will be transformed to signal of frequency $f_A - (B + f_D)$ within the passband of the intermediate frequency amplifier, and the signal received at site B will be transformed to a signal of frequency $(f_A + f_D) - f_B$.

The outputs of the two intermediate frequency amplifiers are fed into a common balanced mixer so that the resultant output is at a frequency $2f_D$ and independent of the actual difference frequency $f_A - f_B$. The output of the mixer is fed to a video amplifier, and thence to a detector, a low pass filter and an indicator (not shown).

In the presence of a moving target, an output is displayed by the indicator, which may also be used to trigger an alarm system. A threshold level is included, either before or after detection, to prevent small objects such as birds, rabbits etc. from raising the alarm.

The frequency stability of the two transmitters must be such that their difference $f_A - f_B$ will remain within the passband of the intermediate frequency amplifiers. In figure 1 this is achieved by ensuring that the bandwidth of the IF amplifiers is enough to accommodate the maximum expected relative frequency drift. Since it is desirable to have a relatively narrow IF bandwidth, from noise considerations, the frequency sources should be crystal controlled.

Figure 2:
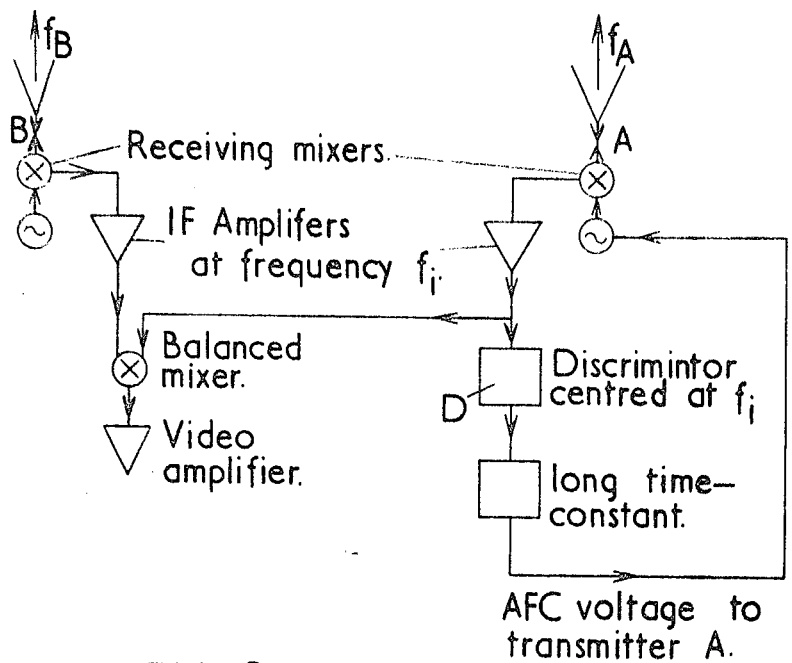
FIGS. 2 and 3 show two alternative forms of radar system according to the present invention.

As an alternative, FIG. 2 shows an arrangement in which automatic frequency control is applied to transmitter A using a frequency discriminator D centered at the IF frequency $f$.

Figure 3:
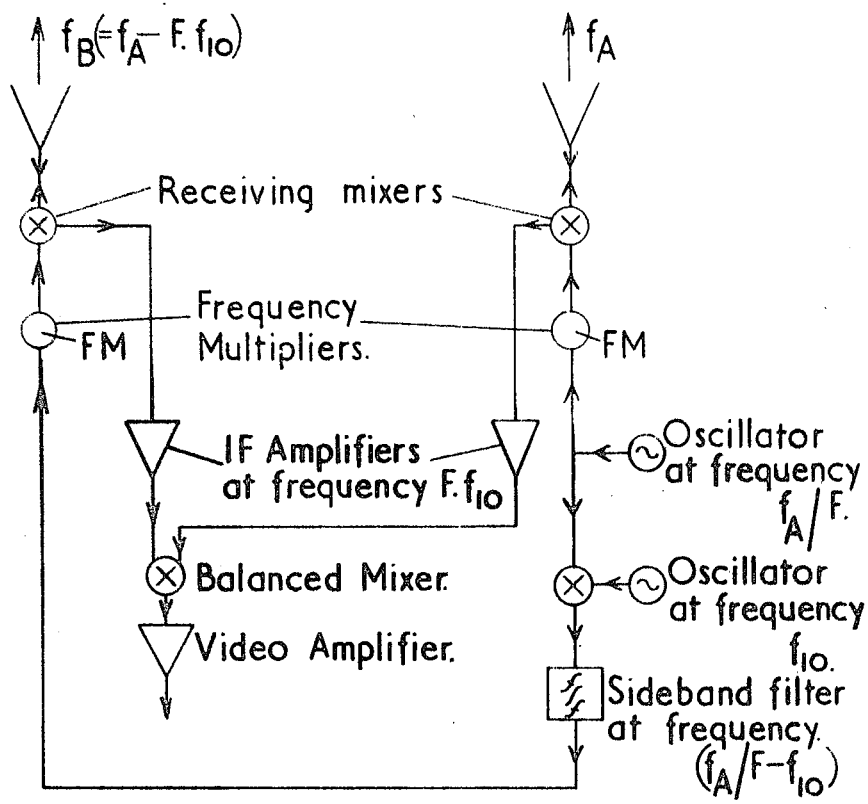

As a further alternative, FIG. 3 shows both transmitter frequencies derived from a common oscillator, operating at a frequency $f_A/F$, F being the frequency multiplication factor of frequency multipliers FM.

The output frequency of the common oscillator is multiplied by one of the multipliers FM to derive a frequency $F_A$ for the transmitter at site A. The output of the common oscillator is also mixed with the output of a further oscillator of frequency $f_{10} = fi/F$ and passed through a sideband filter to extract frequency $f_A/F - f_{10}$ which is then fed to the other multiplier FM to produce a frequency $f_B$ from the transmitter at site B equal to $f_A - F \cdot f_{10}$.

The system may be extended to an indefinite number of transmitter/receiver/antenna modules to cover a wide frontage of several miles. Such a multiple system would preferably use slave transmitters derived from two common oscillators, operating at, for example, one-tenth of the final frequencies. These slave signals would be transmitted by coaxial line which would also serve to transmit the IF signals to a common processing unit. For large distances, booster stations may be required, both for IF and slaving signals. It may also be possible to use these coaxial lines for the transmission of DC power to each station.

In the dual bistatic system of two units (as opposed to multiple installations), each unit comprising a transmitter for one frequency and a receiver for the other frequency may have separate antennas for transmitting and receiving.

Alternatively, a single antenna may be used at each unit to perform both transmitting and receiving functions. In this case, some form of duplexing is necessary such as, for example, by synchronous multiplexing, the use of a nonreciprocal device such as a circulator, diplexing, or the use of polarization.

To perform synchronous multiplexing, the RF feed to the antenna may be switched using PIN diodes, provided that a secondary path is maintained to supply the receiver with a reference signal from the local oscillator during the reception period.

When using a circulator, local oscillator reference is obtained by means of a mismatch at the antenna port of the circulator.

Diplexing may be achieved by inserting frequency selective filters in the transmission and reception paths.

For polarization using duplexing, a square waveguide feed to the antenna may be used. For each unit E-plane of the wave from the transmitter is the H-plane of the wave to the receiver, resulting in no mutual coupling between transmitted and received signals. Local oscillator reference is obtained by a polarization twist mismatch section.

Alternatively, right-hand circular and left-hand circular polarization may be used which may have the additional advantage of reducing interference from rain in outdoor applications.

Any of these duplexing techniques may be extended to multiple installations.

I claim:

1. A radar system comprising first and second transmitters located at first and second sites, the transmitters being operable at first and second frequencies respectively, receivers located at said first and second sites for receiving transmission at said second and first frequencies respectively, means feeding some of the power of said first transmitter to the receiver at the first site to thereby produce a first intermediate frequency output, means feeding some of the power of said second transmitter to the receiver at the second site to thereby produce a second intermediate frequency output, and means for mixing said first and second intermediate frequency outputs to thereby produce a signal dependent upon the rate of change of the total path length between the two sites via a target.

2. A system according to claim 1, wherein the operating frequency of the transmitter at one of the sites is controlled with the aid of a frequency discriminator centered at the intermediate frequency.

3. A system according to claim 1, wherein the frequencies of both transmitters are arranged to be controlled by a common oscillator whose frequency is a submultiple of the operating frequency of the first transmitter, which includes mens for multiplying the output frequency of the common oscillator to obtain the operating frequency of the first transmitter, means for mixing the output of the common oscillator with the output of a further oscillator whose frequency is submultiple of the said intermediate frequency, and means for multiplying the output of the mixing means to obtain the operating frequency of the second transmitter.

4. A system as claimed in claim 1, wherein the transmitter and receiver at each site have a common antenna and suitable means are provided for achieving duplexing.

5. A system as claimed in claim 4 wherein duplexing is achieved using polarization.